United States Patent [19]

Malchow, Jr.

[11] Patent Number: 5,593,953

[45] Date of Patent: Jan. 14, 1997

[54] FRICTION MODIFIER FOR OIL-BASED (INVERT) WELL DRILLING FLUIDS AND METHODS OF USING THE SAME

[75] Inventor: George A. Malchow, Jr., Mentor-on-the-Lake, Ohio

[73] Assignee: The Lubrizol Corporation, Wickliffe, Ohio

[21] Appl. No.: 429,413

[22] Filed: Apr. 26, 1995

[51] Int. Cl.$^6$ .................................................. C09K 7/06
[52] U.S. Cl. ......................... 507/135; 507/134; 252/308
[58] Field of Search ................... 507/134, 135; 252/308

[56] References Cited

U.S. PATENT DOCUMENTS

| | | | |
|---|---|---|---|
| 3,236,769 | 2/1966 | Burdyn et al. | |
| 3,284,352 | 11/1966 | Burdyn et al. | 252/8.5 |
| 3,396,105 | 8/1968 | Burdyn et al. | 507/135 |
| 3,601,194 | 8/1971 | Gallus | 507/134 |
| 3,810,836 | 5/1974 | Norton | 507/135 |
| 4,031,023 | 6/1977 | Musser et al. | |
| 4,141,840 | 2/1979 | Walker et al. | 507/134 |
| 4,172,800 | 10/1979 | Walker | 507/134 |
| 4,181,617 | 1/1980 | Elrod et al. | |
| 4,341,645 | 7/1982 | Blattel et al. | 507/135 |
| 4,770,803 | 9/1988 | Forsberg | 252/75 |
| 4,997,580 | 3/1991 | Karydas et al. | 507/135 |
| 5,415,794 | 5/1995 | Aberkane et al. | 252/45 |

*Primary Examiner*—Philip Tucker
*Attorney, Agent, or Firm*—David M. Shold; Frederick D. Hunter; John H. Englemann

[57] ABSTRACT

This invention relates to a composition comprising a water-in-oil emulsion formed from a brine, a liquid oil, (A) an emulsifier, (B) a friction modifier of the following formula:

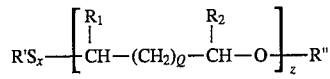

where X=1 to 4,
z=1 to 6,
Q=0 to 2
$R_1$ and $R_2$ are independently H or an aliphatic group containing from 1 to about 16 carbon atoms, provided that the sum of $R_1$ and $R_2$ is between 0 and about 16,
R' is an aliphatic group containing an average of from about 8 to about 24 carbon atoms, and
R" is selected from the group consisting of H, an aliphatic group containing between 1 and an average of about 18 carbons, and

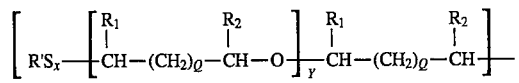

where Q, X, z, $R_1$, $R_2$, R' and R" are defined as set forth above, and Y is 0 to 5. In a preferred embodiment, z is 1. In the most preferred embodiment, Q=0, $R_1$ and $R_2$ are both H, X, and z all equal 1, R' is n-dodecyl, and R" is H. The compositions of the present invention have beneficial lubrication properties. These compositions are useful in drilling, working and completing well bore holes.

30 Claims, No Drawings

FRICTION MODIFIER FOR OIL-BASED (INVERT) WELL DRILLING FLUIDS AND METHODS OF USING THE SAME

TECHNICAL FIELD

This invention relates to friction modifier useful in drilling fluid compositions which serves to decrease the coefficient of friction of the well drilling fluid. The lowering of the coefficient of friction lowers the force required to turn the drill bit in the hole. Gravitational forces increase the coefficient of friction in deviated, horizontal and extended reach wells. It is this type of application where this invention becomes most useful.

BACKGROUND OF THE INVENTION

The primary functions of a drilling fluid or mud are: to carry chips and cuttings produced by drilling to the surface; to lubricate and cool the drill bit and drill string; to form a filter cake which obstructs filtrate invasion in the formation; to maintain the walls of the borehole; to control formation pressures and prevent lost returns; to suspend cuttings during rig shutdowns; and to protect the formation for later successful completion and production. Friction between the drilling apparatus and the borehole is a problem. The greater the friction, the higher the energy required for the drilling process. The higher the friction, the more likely other problems such as drill bit sticking are to occur. In addition, in non-vertically, e.g. horizontally, drilled wells, a reduction in the coefficient of friction makes the non-vertical drilling operation easier. Accordingly it is desirable to use a friction modifying agent which decreases the friction of the drilling process and thereby decreases the probability of bit sticking, decreases the energy costs of drilling, and facilitates non-vertical drilling. It is an object of this invention to supply such a friction modifying agent.

Useful drilling fluids or muds must maintain rheological and viscosity properties under normal operation conditions. Also, the drilling fluids or muds must be able to suspend cuttings and weighting materials upon stopping of circulation of the drilling fluid. It is desirable to have drilling fluids or muds which maintain thixotropy and rheology even with increased solids. Weighting agents and organophilic clays may be used to provide higher viscosity and density to the muds.

There are two major types of drilling fluids, or muds, in use today. In addition, a somewhat different foam drilling fluid is occasionally used. The fluids are either oil based or water based. The oil based fluids are generally water-in-oil emulsions which contain some water in the form of a discontinuous emulsified phase. The oil is the continuous phase. The other major type of drilling fluids are the water based drilling fluids These water based compositions may contain some oil phase. If oil is present, it exists as a discontinuous emulsified phase. Accordingly, the water based fluids which contain oil, are oil-in-water emulsions. Since the external properties of emulsions, such as dispersability, wetting characteristics, and feel, are determined by the continuous phase, the oil based fluids are more like oil, even though they contain water, and the water based fluids are more like water, even though they may contain oil.

The drilling muds of the present invention are water-in-oil emulsions. The optional weighting agents and organophilic clays are generally in the oil phase of the muds. If these materials become water wet (e.g. present in the brine phase of the emulsion), then the emulsion is weakened. If the emulsion is weakened sufficiently, the emulsion may flip, e.g. go from an water-in-oil (e.g. invert) emulsion to a oil-in-water (regular) emulsion. When the emulsion flips, it renders it unusable in well-drilling applications.

U.S. Pat. No. 3,236,769 discloses drilling fluids containing water and clay to which is added a defoamant and a water-soluble, non-ionic compound having surface active properties and characterized by the formula: R-(x-[(CH2-CH2-0)n-H]m)y. The non-ionic compound functions as a flocculating or agglomerating agent for clay.

U.S. Pat. No. 4,031,023 discloses lubricating compositions having oxidative stability and anti-wear properties contributed by certain hydroxy thioethers. These thioethers include molecules such as 2-hydroxy ethyl n-decyl sulfide.

U.S. Pat. No. 4,172,800 discloses aqueous drilling fluids containing an admixture of a polyethoxylated sulfurized fatty acid and polyalkylene glycol. Such fluids are especially useful where reduced torque drilling fluids are needed.

U.S. Pat. No. 4,181,617 discloses an aqueous drilling fluid having a lubricant consisting essentially of the reaction product of a fatty vegetable oil with 4,4'-thiodiphenol.

SUMMARY OF THE INVENTION

This invention relates to a composition comprising a water-in-oil emulsion formed from a brine, a liquid oil, (A) an emulsifier, (B) a friction modifier of the following formula:

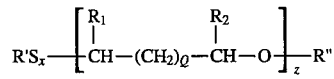

where X=1 to 4, z=1 to 6,

Q=0 to 2

$R_1$ and $R_2$ are independently H or an aliphatic group containing from 1 to about 16 carbon atoms, provided that the sum of $R_1$ and $R_2$ is between 0 and about 16, R' is an aliphatic group containing an average of from about 8 to about 24 carbon atoms, and R" is selected from the group consisting of H, an aliphatic group containing between 1 and an average of about 18 carbons, and

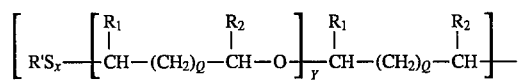

where Q, X, z, $R_1$, $R_2$, R' and R" are defined as set forth above, and Y is 0 to 5. In a preferred embodiment, z is 1. In the most preferred embodiment, Q=0, $R_1$ and $R_2$ are both H, X, and z all equal 1, R' is n-dodecyl, and R" is H.

DESCRIPTION OF THE PREFERRED EMBODIMENTS

The term "emulsion" as used in the specification and the claims is intended to cover water-in-oil emulsions. The term is also intended to cover compositions derived from or formulated as water-in-oil emulsions which are gelatinous or semi-gelatinous compositions.

The term "hydrocarbyl" includes hydrocarbon, as well as substantially hydrocarbon, groups. Substantially hydrocarbon describes groups which contain non-hydrocarbon substituents which do not alter the predominantly hydrocarbon nature of the group.

Examples of hydrocarbyl groups include the following:

(1) hydrocarbon substituents, that is, aliphatic (e.g., alkyl or alkenyl), alicyclic (e.g., cycloalkyl, cycloalkenyl) substituents, aromatic-substituted aliphatic substituents or aromatic-substituted alicyclic substituents, or aliphatic- and alicyclic-substituted aromatic substituents and the like as well as cyclic substituents wherein the ring is completed through another portion of the molecule (that is, for example, any two indicated substituents may together form an alicyclic radical);

(2) substituted hydrocarbon substituents, that is, those substituents containing non-hydrocarbon groups which, in the context of this invention, do not alter the predominantly hydrocarbon nature of the substituent; those skilled in the art will be aware of such groups (e.g., halo (especially chloro and fluoro), hydroxy, alkoxy, mercapto, alkylthio, nitro, nitroso, sulfoxy, etc.);

(3) hereto substituents, that is, substituents which will, while having a predominantly hydrocarbon character within the context of this invention, contain an atom other than carbon present in a ring or chain otherwise composed of carbon atoms. Suitable heteroatoms will be apparent to those of ordinary skill in the an and include, for example, sulfur, oxygen, nitrogen and such substituents as, e.g., pyridyl, furyl, thienyl, imidazolyl, etc. In general, no more than about 2, preferably no more than one, non-hydrocarbon substituent will be present for every ten carbon atoms in the hydrocarbyl group. Typically, there will be no such non-hydrocarbon substituents in the hydrocarbyl group. The hydrocarbyl group may be purely hydrocarbon.

As used in the specification and claims a "barrel" is 42 gallons U.S.

As described above, the present invention relates to a composition comprising a water-in-oil emulsion formed from a brine, a liquid oil, (A) an emulsifier, (B) a friction modifier of the following formula:

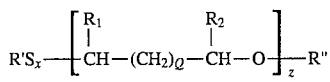

where X=1 to 4, z=1 to 6,

Q=0 to 2

$R_1$ and $R_2$ are independently H or an aliphatic group containing from 1 to about 16 carbon atoms, provided that the sum of $R_1$ and $R_2$ is between 0 and about 16, R' is an aliphatic group containing an average of from about 8 to about 24 carbon atoms, and R" is selected from the group consisting of H, an aliphatic group containing between 1 and an average of about 18 carbons, and

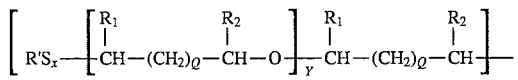

where Q, X, z, $R_1$, $R_2$, R' and R" are defined as set forth above, and Y is 0 to 5. In a preferred embodiment, z is 1. In the most preferred embodiment, Q=0, $R_1$ and $R_2$ are both H, X, and z all equal 1, R' is n-dodecyl, and R" is H.

The friction modifiers may be prepared by condensation reactions. For example, n-dodecyl-(2-hydroxyethyl) sulfide may be prepared by condensing 1-dodecene with mercaptoethanol. The corresponding bis ether, 2,2'- di-(n-dodecylthio)-diethyl ether may be prepared by condensing the alcohol in the presence of an acid catalyst. The R" group may be a hydrogen, in which case the molecule is an ether. R" may also be an aliphatic group containing between 1 to an average of about 18 carbon atoms. If R" is an aliphatic group, the molecules may be prepared by condensing a mixture of the thio-ether alcohol with the desired aliphatic alcohol. Such a synthesis will likely result in the formation of some di-aliphatic ether which would probably not present a problem in drilling mud applications. R" may be a thio-ether radical as shown in the structure above. Different thio-ether radicals may be coupled to create unsymetrical ethers. Finally, R" may be a mixture of thio-ether radicals, aliphatic radicals, and hydrogen. Such ethers, and mixtures of ethers may be prepared by the condensation of appropriate combinations of alcohols. If it is desired to prepare a mixture in which some of the R" are hydrogen and others are thio-ether radicals or aliphatic radicals, this may be accomplished by conducting the condensation reaction so that it does not go completion, and accordingly, some unreacted thioether alcohol remains.

The

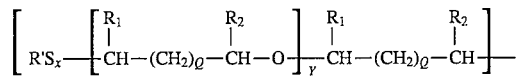

groups may be prepared by reaction of an epoxide with a suitable mercaptan. The reaction may be conducted in the presence of sulfur if the desired product is a polysulfide species (X=2 to 4 in the formula above). The epoxide may be a terminal epoxide or it may be an epoxide formed from a non-terminal olefin. The preferred epoxides are ethylene and propylene oxide. These reactions are carried out in the presence of an alkaline catalyst such as sodium or potassium methoxide at temperatures from 100–200C. With the lower epoxides such as ethylene oxide, the reactions are run under pressure. The resulting structures with a terminal hydroxyl group can be further condensed with itself or with other aliphatic alcohols to form the subsequent ether structures. These reactions are run with strong acid catalysts such as sulfuric acid or methane sulfonic acid at temperatures from 100–200C. The water formed during the reaction is removed under these conditions. Some of the molecules may also be prepared by the reaction of alpha olefins with thioglycols. These reactions are generally run in the presence of free radical catalysts at temperatures from 75–100C.

EMULSIFIERS

The friction modifier of the present invention operates in water-in-oil emulsion drilling fluids or muds. Any emulsifier suitable as a water-in-oil emulsifiers may be used in preparing the drilling fluids. These emulsifiers preferably have HLB's (hydrophile-lipophile balance) of less than 10 and more preferably in the range of 4 to 8. Such emulsifiers are well known in the art and lists as well as methods of preparing the emulsions are given in sources such as the Kirk Othmer's "Encyclopedia of Chemical Technology", 3rd Edition, Vol. 8, pages 900–930, Interscience Publishers, New York (1979). Often similar types of chemical emulsifiers are used to prepare water-in-oil and oil-in-water emulsions. However, within any given chemical type, it is important to select emulsifiers having the proper HLB for the preparation of water-in-oil emulsion. The following are examples of useful emulsifiers:

AMINE DERIVATIVE OF CARBOXYLIC ACYLATING AGENTS

The reaction products of carboxylic acylating agents with polyalkylenepolyamines and hydroxylamines are especially useful emulsifiers. The carboxylic acylating agents include mono, di, tri and succinic acylating agents.

CARBOXYLIC ACYLATING AGENTS

The carboxylic acylating agents are carboxylic acylating agents having from about 1 to about 4 carboxylic groups, preferably 2 or 3. The term acylating agents encompasses acids, anhydrides, lower esters ($C_{1-7}$ esters), halides, etc. Preferably, the acylating agents are acids or anhydrides. Carboxylic acylating agents may be monocarboxylic or polycarboxylic acylating agents.

Monocarboxylic acylating agents include fatty carboxylic acylating agents including fatty acids and Dieis-Alder monocarboxylic reaction products. Fatty acids generally contain from about 8, preferably from about 10, more preferably from about 12 to about 30, more preferably to about 24 carbon atoms. Examples of fatty acids include stearic, oleic, lauric, linoleic, abietic, palmitic, sebacic, linolenic, behenic, tall oil and rosin acids.

The polycarboxylic acylating agents of the present invention include dicarboxylic acylating agents such as succinic acylating agents, dimer acylating agents, and Dieis-Alder dicarboxylic acylating agents. Tricarboxylic acylating agents include trimer acylating agents and Dieis-Alder tricarboxylic acylating agents.

The dimer acylating agents include products resulting from the dimerization of unsaturated fatty acids, e.g., the above-described fatty acids. Generally, the dimer acids have an average from about 18, preferably from about 28 to about 44, preferably to about 40 carbon atoms. The dimer acids have preferably about 36 carbon atoms. The dimer acids are preferably prepared from $C_{18}$ fatty acids, such as oleic acids. The dimer acids are described in U.S. Pat. Nos. 2,482,760, 2,482,761, 2,731,481, 2,793,219, 2,964,545, 2,978,468, 3,157,681, and 3,256,304, the entire disclosures of which are incorporated herein by reference. Examples of dimer acids include Empol® 1014, 1016 and 1018 Dimer Acid, each available from Emery Industries, Inc. and Hystrene® dimer acids 3675, 3680, 3687 and 3695, available from Humko Chemical.

The polycarboxylic acylating agents may be dicarboxylic acylating agents which are the Dieis-Alder type reaction products of an unsaturated fatty acid (e.g., the above-described fatty acids, preferably tall oil acids and oleic acids) with alpha, beta-ethylenically unsaturated carboxylic acylating agent (e.g., acrylic or methacrylic acylating agents) such as are taught in U.S. Pat. No. 2,444,328, the disclosure of which is incorporated herein by reference. These Dieis-Alder acylating agents include Westvaco® Diacid H-240, 1525 and 1550, each being commercially available from the Westvaco Corporation.

The polycarboxylic acids or anhydrides may be hydrocarbyl-substituted succinic acylating agents, preferably acids or anhydrides, more preferably anhydrides. The hydrocarbyl group generally contains an average from about eight, preferably from about 14, more preferably from about 16 to about 40, preferably to about 30, more preferably to about 24, still more preferably to about 18 carbon atoms. Preferably, the hydrocarbyl group is an alkenyl group. The alkenyl group may be derived from one or more of the above-described olefins.

The succinic acylating agents are prepared by reacting the above-described olefins or isomerized olefins with unsaturated carboxylic acids such as fumaric acids or maleic acid or anhydride at a temperature of about 160° to about 240° C., preferably about 185° to about 210° C. Free radical initiators (e.g., t-butyl catechol) may be used to reduce or prevent the formation of polymeric byproducts. The procedures for preparing the acylating agents are well known to those skilled in the art and have been described for example in U.S. Pat. No. 3,412,111; and Ben et al, "The Ene Reaction of Maleic Anhydride With Alkenes", J. C. S. Perkin II (1977), pages 535–537. These references are incorporated by reference for their disclosure of procedures for making the above acylating agents.

The polycarboxylic acylating agent may also be a tricarboxylic acylating agent. Examples of tricarboxylic acylating agents include trimer and Dieis-Alder tricarboxylic acylating agents. These acylating agents generally contain an average from about 18, preferably from about 30, more preferably from about 36 to about 66, preferably to about 60 carbon atoms. Trimer acids are prepared by the trimerization of the above-described fatty acids. The Dieis-Alder tricarboxylic acylating agents are prepared by reacting an unsaturated monocarboxylic acid with a alpha,beta-ethylenically unsaturated dicarboxylic acid (e.g., fumaric acid or maleic acid or anhydride). The Dieis-Alder acylating agent may contain an average from about 12, preferably from about 18 to about 40, preferably to about 30 carbon atoms. Examples of these tricarboxylic acids include Empol® 1040 available commercially from Emery Industries, Hystrene® 5460 available commercially from Humko Chemical, and Unidyme® 60 available commercially from Union Camp Corporation.

The carboxylic acylating agent may be a mixture containing at least 10% by weight of a carboxylic acylating agent having at least three carboxylic groups. The mixture preferably contains at least 50% by weight, preferably 80% by weight, preferably 90% by weight tricarboxylic acylating agent. The carboxylic acylating agents may be mixtures of the above-identified tricarboxylic acylating agents with monocarboxylic acylating agents and the above-identified dicarboxylic acylating agents. The mixture may contain mono-, di-, or tricarboxylic acids. The monocarboxylic acids may have from 2, preferably from about 8, more preferably from about 12 to about 30, preferably to about 24 carbon atoms. Examples of monocarboxylic acids include acetic, propionic, butyric and fatty carboxylic acids such as oleic, stearic, linoleic, dodecanoic or tall oil acids.

Throughout this specification and in the appended claims, the term "succinic acylating agent" is intended to include carboxylic acids as well as acid-producing derivatives thereof such as anhydrides, esters, acyl halides and mixtures thereof, unless otherwise specifically stated. The hydrocarbyl substituted succinic acylating agents may be represented by the following formulae:

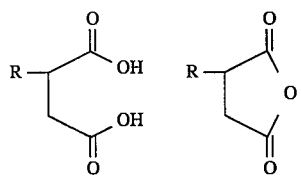

wherein R is a $C_{10}$ to about a $C_{500}$ hydrocarbyl group. As will be set forth more fully below, when two succinic acylating agents are combined in a coupled molecule the R group may be a $C_2$ to about a $C_{500}$ hydrocarbyl group. Preferably, R is an aliphatic or alicyclic hydrocarbyl group with less than about 10% of its carbon-to-carbon bonds being unsaturated. As set forth more fully below, R may derived from olefin polymers. R may also be derived from non-polymerized olefins of from 10 to about 18 carbon atoms with alpha-olefins being particularly useful. For bridged species olefins containing 2 to 18 carbons may be used. Examples of such olefins include ethylene, propene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, etc. Commercially available alpha olefin fractions such as $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, etc., are particularly useful; these commercial alpha-olefin fractions also usually include minor amounts of alpha-olefins outside the given ranges. The R group may also be derived from olefinic compounds containing up to about 500 carbon atoms. Preferably the R group contains about 60 carbon atoms to about 140 carbon atoms, and may contain polar substituents, oil-solubilizing pendant groups, and be unsaturated within the general limitations explained hereinabove. The production of hydrocarbyl substituted succinic derivatives is well known to those skilled in the art and need not be discussed in detail herein. Generally, these processes involve the reaction of (1) an ethylenically unsaturated carboxylic acid, acid halide, anhydride or ester reactant, such as maleic anhydride, with (2) an ethylenically unsaturated hydrocarbon (a chlorine free process) or a chlorinated hydrocarbon (a chlorine process) at a temperature within the range of about 100°–300° C., preferably, about 100° C. to about 200° C. The product from this reaction is a hydrocarbyl-substituted succinic anhydride wherein the substituent is derived from the olefin or chlorinated hydrocarbon. The present invention works equally well with the products produced by a chlorine process or a chlorine free process. If desired, the reaction product of the halide or olefin with the unsaturated acid may be hydrogenated to remove all or a portion of any ethylenically unsaturated covalent linkages by standard hydrogenation procedures.

The ethylenically unsaturated hydrocarbon reactant, used in a chlorine free process, may be derived from olefin streams. The chlorinated hydrocarbon reactant used in a chlorine process, may be derived from substantially saturated petroleum fractions or substantially saturated olefin polymers. Polymers and chlorinated polymers derived from mono-olefins having from 2 to about 30 carbon atoms are preferred. Especially useful polymers are the polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. These are exemplified by 2-butene, 3-pentene, and 4-octene.

Interpolymers of 1-mono-olefins such as illustrated above with each other and with other interpolymerizable olefinic substances such as aromatic olefins, cyclic olefins, and polyolefins, are also useful sources of the ethylenically unsaturated reactant. Such interpolymers include for example, those prepared by polymerizing isobutene with styrene, isobutene with butadiene, propene with isoprene, propene with isobutene, ethylene with piperylene, isobutene with chloroprene, isobutene with p-methyl-styrene, 1-hexene with 1,3-hexadiene, 1-octene with 1-hexene, 1-heptene with 1-pentene, 3-methyl-1-butene with 1-octene, 3,3-dimethyl-1-pentene with 1-hexene, isobutene with styrene and piperylene, etc.

For reasons of hydrocarbon solubility, the interpolymers contemplated for use in preparing the acylating agents of this invention are preferably substantially aliphatic and substantially saturated, that is, they should contain at least about 80% and preferably about 95%, on a weight basis, of units derived from aliphatic mono-olefins. Preferably, they will contain no more than about 5% olefinic linkages based on the total number of the carbon-to-carbon covalent linkages present.

The polymers and chlorinated polymers may be obtained by the polymerization of a $C_4$ refinery stream having a butene content of about 35% to about 75% by weight and an isobutene content of about 30% to about 60% by weight in the presence of a Lewis acid catalyst such as aluminum chloride or boron trifluoride. These polyisobutenes preferably contain predominantly (that is, greater than about 80% of the total repeat units) isobutene repeat units of the formula:

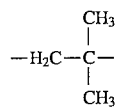

The polymeric materials which may be used to prepare the succinic acylating agents may be characterized, as above, by the average number of carbon atoms which they contain. Polymeric materials are not uniform, and contain a variety of molecules of different chain lengths. Such polymers have also been characterized by their Mn (number average molecular weight). The average number of carbons correlates with the Mn of the polymer. For example, if a polymer containing an average of 100 carbon atoms is reacted with maleic anhydride, the substituted succinic anhydride produced has an Mn of approximately 1500. Similarly, for a polymer containing an average of 500 carbon atoms, the substituted succinic anhydride produced would have an Mn of approximately 7100. Such polymers have also been characterized by their Mw (weight average molecular weight). Because the chain lengths of a polymeric material are not always evenly distributed, the Mw and Mn are not always identical. The polymeric materials useful in preparing the hydrocarbyl substituted succinic acylating agents have Mw/Mn ratios from about 1.5 to about 4.5. Materials with ratios of about 1.5 to about 3.6 or 3.2 are useful. Materials with ratios of about 1.8, or about 2, to about 2.5, about 3.2, or about 3.6 are useful. Gel permeation chromatography may be used to determine the values of Mw and Mn as well as the Mw/Mn ratio. A useful method is disclosed in U.S. Pat. No. 4,234,435.

If an excess of maleic anhydride is reacted with the polymeric material to form the substituted succinic acylating agent, more than one succinic group may add to an individual polymer chain. The amount of such poly-substitution may be expressed in terms of the number of succinic groups for each equivalent weight of substituent group (derived from the polymeric material).

The equivalent weight of the polyalkene is its Mn. The equivalents of substituent groups in the succinic acylating agent is determined by dividing the total weight of substituents by the Mn of the polyalkene. The number of succinic groups per equivalent weight of substituents present in the succinic acylating agent may be found by comparing the equivalents of succinic groups in the molecule to the equivalents of substituents. This subject is disclosed in U.S. Pat. No. 4,234,435 which is hereby incorporated by reference for its disclosure of methods determining the number of succinic groups per equivalent of substituents and for its disclosure of methods of measuring the values of Mw and Mn.

The substituted succinic acylating agents useful in the present invention have from about 1.0 to about 4.5 succinic groups for each equivalent weight of substituent group. The preferred number of succinic groups for each equivalent weight of substituent group is from about 1.0 to about 2.5 and the more preferred range is from about 1.0 to 2.0.

If acids are the desired starting material, the hydrocarbyl substituted succinic anhydrides may be hydrolyzed by treatment with water or steam to the corresponding acid. Acid halides of the hydrocarbyl-substituted succinic acids may be used as the acylating agents of this invention. They may be prepared by the reaction of such acids or their anhydrides with halogenating agents such as phosphorus tribromide, phosphorus pentachloride, phosphorus oxychloride or thionyl chloride.

ALKANOL AMINES

The hydroxyamines may be primary, secondary or tertiary. The terms "hydroxyamine" "alkanol amine," and "aminoalcohol" describe the same class of compounds and, therefore, may be used interchangeably.

The hydroxyamines may be primary, secondary or tertiary alkanol amines or mixtures thereof. Such amines may be represented, respectfully, by the formulae:

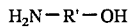

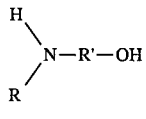

and

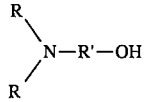

wherein each R is independently a hydrocarbyl group of one to about eight carbon atoms or hydroxyl-substituted hydrocarbyl group of two to about eight carbon atoms and R' is a divalent hydrocarbyl group of about two to about 18 carbon atoms. The group —R'—OH in such formulae represents the hydroxyl-substituted hydrocarbyl group. R' may be an acyclic, alicyclic or aromatic group. Typically, R' is an acyclic straight or branched alkylene group such as an ethylene, 1,2-propylene, 1,2-butylene, 1,2-octadecylene, etc. group. Where two R groups are present in the same molecule they may be joined by a direct carbon-to-carbon bond or through a heteroatom (e.g., oxygen, nitrogen or sulfur) to form a 5-, 6-, 7- or 8-membered ring structure. Typically, however, each R is a lower alkyl group of up to seven carbon atoms.

Examples of useful N-(hydroxyl-substituted hydrocarbyl) amines include ethanolamine di-ethanolamine, ethylethanolamine, dimethylethanolamine, diethylethanolamine, di-(3-hydroxylpropyl) amine, N-(3-hydroxylbutyl) amine, N-(4-hydroxylbutyl) amine, N,N-di-(2-hydroxylpropyl) amine, N-(2-hydroxylethyl) morpholine, its thio analog, N-(2-hydroxyl ethyl) cyclohexyl amine, N-3-hydroxyl cyclopentyl amine, N-(hydroxyl ethyl) piperazine, and the like.

The tertiary alkanol amines may be reacted under condensing conditions such that any salts which are formed between the carboxyl groups and the tertiary amine portion of the alkanol amine molecule are converted to condensed products such as esters. In a typical reaction, the anhydride ring is opened by the alcohol to form an ester. The remaining carboxyl group reacts with a second molecule of the alkanol amine to form an second ester. The tertiary alkanol amines may be reacted under non-condensing conditions to form an ester salt product which acts as an emulsifier. The reaction is conducted under conditions such that condensation reactions are unlikely to occur. Under these non-condensing reaction conditions, the product of the reaction between a hydrocarbyl substituted succinic anhydride acylating agent and a tertiary alkanol amine is an ester salt.

Further hydroxyamines are the hydroxy-substituted primary amines described in U.S. Pat. No. 3,576,743 by the general formula

wherein $R_a$ is a monovalent organic group containing at least one alcoholic hydroxy group. The total number of carbon atoms in $R_a$ preferably does not exceed about 20. Hydroxy-substituted aliphatic primary amines containing a total of up to about 10 carbon atoms are useful. The polyhydroxy-substituted alkanol primary amines wherein there is only one amino group present (i.e., a primary amino group) having one alkyl substituent containing up to about 10 carbon atoms and up to about 6 hydroxyl groups are useful. These alkanol primary amines correspond to $R_a$—NH$_2$ wherein $R_a$ is a mono- or polyhydroxy-substituted alkyl group. Specific examples of the hydroxy-substituted primary amines include 2-amino-1-butanol, 2-amino-2-methyl-1-propanol, p-(beta-hydroxyethyl)-aniline, 2-amino-1-propanol, 3-amino-1-propanol, 2-amino-methyl-1,3-propanediol, 2-amino-2-ethyl-1, 3-propanediol, N-(beta-hydroxypropyl)-N'-(beta-aminoethyl)piperazine, tris-(hydroxymethyl) amino methane (also known as trismethylolamino methane), 2-amino-1-butanol, ethanolamine, beta-(beta-hydroxyethoxy)-ethyl amine, glucamine, 4-amino-3-hydroxy-3-methyl-1-butene (which may be prepared according to procedures known in the art by reacting isopreneoxide with ammonia), N-3-(aminopropyl)-4-(2-hydroxyethyl)-piperadine, 2-amino-6-methyl-6-heptanol, 5-amino-1-pentanol, N-beta-hydroxyethyl)1,3-diamino propane, 1,3-diamino-2-hydroxypropane, N-beta-hydroxy ethoxyethyl)ethylenediamine, trismethylolaminomethane and the like. U.S. Pat. No. 3,576,743 is incorporated herein by reference.

Hydroxyalkyl alkylene polyamines having one or more hydroxyalkyl substituents on the nitrogen atoms, are also useful. Useful hydroxyalkyl-substituted alkylene polyamines include those in which the hydroxyalkyl group is a lower hydroxyalkyl group, i.e., having less than eight carbon atoms. Examples of such hydroxyalkyl-substituted polyamines include N-(2-hydroxyethyl) ethylene diamine, N,N-bis(2-hydroxyethyl) ethylene diamine, 1-(2-hydroxyethyl)-piperazine, monohydroxypropyl-substituted diethylene triamine, dihydroxypropyl-substituted tetraethylene pentamine, N-(3-hydroxybutyl) tetramethylene diamine, etc. Higher homologs as are obtained by condensation of the above-illustrated hydroxy alkylene polyamines through amino groups or through hydroxy groups are likewise useful. Condensation through amino groups results in a higher amine accompanied by removal of ammonia and condensation through the hydroxy groups results in products containing ether linkages accompanied by removal of water.

The hydroxyamines may also be ether N-(hydroxy-substituted hydrocarbyl)amines. These are hydroxyl-substituted poly(hydrocarbyloxy) analogs of the above-described hydroxy amines (these analogs also include hydroxyl-substituted oxyalkylene analogs). Such N-(hydroxyl-substituted hydrocarbyl) amines may be conveniently prepared by reaction of epoxides with aforedescribed-amines and may be represented by the formulae:

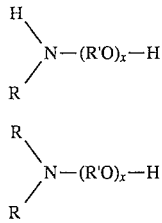

wherein x is a number of about 2 to about 15, each R is independently a hydrocarbyl group of one to about eight carbon atoms or hydroxyl-substituted hydrocarbyl group of two to about eight carbon atoms and R' is a divalent hydrocarbyl group of about two to about 18 carbon atoms.

Polyamine analogs of these hydroxy amines, particularly alkoxylated alkylene polyamines (e.g., N,N-(diethanol)-ethylene diamine) may also be used. Such polyamines may be made by reacting alkylene amines (e.g., ethylenediamine) with one or more alkylene oxides (e.g., ethylene oxide, octadecene oxide) of two to about 20 carbons. Similar alkylene oxide-alkanol amine reaction products may also be used such as the products made by reacting the aforedescribed-described primary or secondary alkanol amines with ethylene, propylene or higher epoxides in a 1:1 or 1:2 molar ratio. Reactant ratios and temperatures for carrying out such reactions are known to those skilled in the art.

Specific examples of alkoxylated alkylene polyamines include N-(2-hydroxyethyl)ethylene diamine, N,N-bis(2-hydroxyethyl) ethylene diamine, 1-(2-hydroxyethyl) piperazine, mono(hydroxypropyl)-substituted diethylene triamine, di(hydroxypropyl)-substituted tetraethylene pentamine, N-(3-hydroxybutyl)tetramethylene diamine, etc. Higher homologs obtained by condensation of the above-illustrated hydroxy alkylene polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid mono- or polyamines are also useful.

POLYALKYLENEPOLYAMINES

Alkylenepolyamines are represented by the formula:

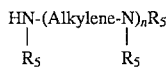

wherein n has an average value from 1, or about 2 to about 10, or to about 7, or to about 5, and the "Alkylene" group has from 1, or about 2 to about 10, or to about 6, or to about 4 carbon atoms. Each $R_5$ is independently hydrogen, or an aliphatic or hydroxy-substituted aliphatic group of up to about 30 carbon atoms. $R_5$ may be defined the same as $R_1$.

Such alkylenepolyamines include methylenepolyamines, ethylenepolyamines, butylenepolyamines, propylenepolyamines, pentylenepolyamines, etc. The higher homologs and related heterocyclic amines such as piperazines and N-aminoalkyl-substituted piperazines are also included. Specific examples of such polyamines are ethylenediamine, diethylenetriamine (DETA), triethylenetetraamine (TETA), tris-(2-aminoethyl)amine, propylenediamine, trimethylenediamine, tripropylenetetraamine, tetraethylenepentamine, hexaethyleneheptamine, pentaethylenehexamine, etc.

Higher homologs obtained by condensing two or more of the above-noted alkylene amines are similarly useful as are mixtures of two or more of the afore-described polyamines.

Ethylenepolyamines, such as those mentioned above, are useful. Such polyamines are described in detail under the heading Ethylene Amines in Kirk Othmer's "Encyclopedia of Chemical Technology", 2d Edition, Vol. 7, pages 22–37, Interscience Publishers, New York (1965). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylenepolyamines including cyclic condensation products such as the afore-described piperazines. Ethylenepolyamine mixtures are useful.

Other useful types of polyamine mixtures are those resulting from stripping of the above-described polyamine mixtures to leave as residue what is often termed "polyamine bottoms". In general, alkylenepolyamine bottoms can be characterized as having less than two, usually less than 1% (by weight) material boiling below about 200 C. A typical sample of such ethylene polyamine bottoms obtained from the Dow Chemical Company of Freeport, Texas designated "E-100" has a specific gravity at 15.6 C. of 1.0168, a percent nitrogen by weight of 33.15 and a viscosity at 40 C. of 121 centistokes. Gas chromatography analysis of such a sample contains about 0.93% "Light Ends" (most probably DETA), 0.72% TETA, 21.74% tetraethylene pentamine and 76.61% pentaethylenehexamine and higher (by weight). These alkylenepolyamine bottoms include cyclic condensation products such as piperazine and higher analogs of diethylenetriamine, triethylenetetraamine and the like.

These alkylenepolyamine bottoms can be reacted solely with the acylating agent or they can be used with other amines, polyamines, or mixtures thereof.

Another useful polyamine is a condensation reaction between at least one hydroxy compound with at least one polyamine reactant containing at least one primary or secondary amino group. The hydroxy compounds are preferably polyhydric alcohols and amines. The polyhydric alcohols are described above. Preferably the hydroxy compounds are polyhydric amines. Polyhydric amines include any of the above-described monoamines reacted with an alkylene oxide (e.g., ethylene oxide, propylene oxide, butylene oxide, etc.) having two to about 20, or to about four carbon atoms. Examples of polyhydric amines include tri(hydroxypropyl)amine, tris-(hydroxymethyl)amino methane, 2-amino-2-methyl-1,3-propanediol, N,N,N',N'-tetrakis(2-hydroxypropyl)ethylenediamine, and N,N,N',N'-tetrakis(2-hydroxyethyl)ethylenediamine, preferably tris(hydroxymethyl)aminomethane (THAM).

Polyamines, which react with the polyhydric alcohol or amine to form the condensation products or condensed amines, are described above. Preferred polyamine reactants include triethylenetetraamine (TETA), tetraethylenepentamine (TEPA), pentaethylenehexamine (PEHA), and mixtures of polyamines such as the above-described "amine bottoms".

IMIDAZOLINES

The imidazolines useful as emulsifiers are the condensation products of fatty acids and polyamines. The polyamines useful in this reaction are characterized by the presence of at least two primary amine groups or one primary and one secondary amine group. The polyamines used are generally the alkylene polyamines such as ethylene diamine, diethylenetriamine, triethylenetetraamine, etc. The fatty acids which may used to form this class of imidazolines include lauric, myristic, palmitic, stearic, oleic, linoleic, linolenic, eleostearic and ricinoleic. Imidazolines based on fatty acids are commercially available from chemical suppliers such as Croda Universal Ltd.

GLYCEROL ESTERS

Glycerol ester emulsifiers are formed by the reaction of fatty acids with an excess of glycerol to form a mixture of mono and diglycerides. The common C-12 to C-18 fatty acids are suitable starting materials. In place of the fatty acid, the raw vegetable oil can be used to react with an excess of glycerol. A typical example is glycerol monooleate (Arlacel 186-ICI).

POLYOXYALKYLENE ESTERS

The emulsifier may be a polyoxyalkylene fatty ester. Polyoxyalkylene fatty esters may be prepared from any polyoxyalkylene polyol or an polyoxyalkylene alcohol and a fatty acid. The polyoxyalkylene polyol and the polyoxyalkylene alcohol, e.g., polyoxyalkylated alcohol or phenol, are disclosed above. The fatty acid is preferably the fatty monocarboxylic acid described above. Polyoxyalkylene fatty esters are available commercially from Armak Company under the tradename Ethofat. Specific examples of polyoxyalkylene fatty esters include Ethofat C/15 and C/25, which are coco fatty esters formed using 5 and 15 moles, respectively, of ethylene oxide; Ethofat O/15 and O/20, which are oleic esters formed using 5 and 10 moles of ethylene oxide; and Ethofat 60/15, 60/20 and 60/25 which are stearic esters formed with 5, 10 and 15 moles of ethylene oxide respectively.

POLYOXYALKYLENE AMINE

Polyoxyalkylene polyamines, e.g., polyoxyalkylene diamines and polyoxyalkylene triamines, having average molecular weights ranging from about 200, or about 400 up to 4000, or to about 2000 may be used as emulsifiers. Illustrative examples of these polyoxyalkylene polyamines may be characterized by the formulae: $NH_2$-Alkylene (O-Alkylene)$_m NH_2$, wherein m has a value of about 3 to 70 and preferably about 10 to 35; and $R(Alkylene(O-Alkylene)_n NH_2)_{3-6}$, wherein n is such that the total value is from about 1 to 40 with the proviso that the sum of all of the n's is from about 3 to about 70 and generally from about 6 to about 35 and R is a polyvalent saturated hydrocarbon radical of up to 10 carbon atoms having a valence of 3 to 6. The alkylene groups may be straight or branched chains and contain from 1 to 7 carbon atoms and usually from 1 to 4 carbon atoms. The various alkylene groups present may be the same or different.

The polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Huntsman Chemical Company under the trade name "Jeffamines D-230, D-400, D-1000, D-2000, T-403, etc."

A number of hydroxyamines wherein b is zero are available from the Armak Chemical Division of Akzona, Inc., Chicago, Ill., under the general trade designation "Ethomeen" and "Propomeen". Specific examples of such products include "Ethomeen C/15" which is an ethylene oxide condensate of a cocoamine containing about 5 moles of ethylene oxide; "Ethomeen C/20" and "C/25" which also are ethylene oxide condensation products from cocoamine containing about 10 and 15 moles of ethylene oxide respectively; "Ethomeen O/12" which is an ethylene oxide condensation product of oleylamine containing about 2 moles of ethylene oxide per mole of amine. "Ethomeen S/15" and "S/20" which are ethylene oxide condensation products with soyaamine containing about 5 and 10 moles of ethylene oxide per mole of amine respectively; and "Ethomeen T/12, T/15" and "T/25" which are ethylene oxide condensation products of tallowamine containing about 2, 5 and 15 moles of ethylene oxide per mole of amine respectively. "Propomeen O/12" is the condensation product of one mole of oleyl amine with 2 moles propylene oxide. Preferably, the salt is formed from Ethomeen C/15 or S/15 or mixtures thereof.

Commercially available examples of amines where b is 1 include "Ethoduomeen T/13", "T/20" and "T/25" which are ethylene oxide condensation products of N-tallow trimethylene diamine containing 3, 10 and 15 moles of ethylene oxide per mole of diamine, respectively.

Another group of polyoxyalkylene amines are the commercially available liquid TETRONIC polyoxyalkylated amine polyols sold by Wyandotte Chemicals Corporation. These amines are represented by the general formula:

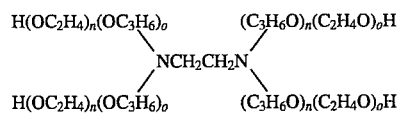

Such hydroxyamines are described in U.S. Pat. No. 2,979,528 which is incorporated herein by reference. The hydroxyamines corresponding to the above formula may have a number average molecular weight of up to about 10,000 wherein the ethyleneoxy groups contribute to the total number average molecular weight in the percentage ranges discussed above. A specific example would be such a hydroxyamine having a number average molecular weight of about 8000 wherein the ethyleneoxy groups account for 7.5%–12% by weight of the total number average molecular weight. Such hydroxyamines can be prepared by reacting an alkylenediamine, such as ethylenediamine, propylenediamine, hexamethylenediamine etc., with propylene oxide. Then the resulting product is reacted with ethylene oxide.

ETHOXYLATED ALKYLPHENOLS

The ethoxylated alkyl phenol emulsifiers are formed by the reaction of ethylene oxide with an alkyl phenol. The alkyl group can be either straight chain or branched with a C8 to C12 chain length being the most common. Anywhere from 1 to 40 ethylene oxide units may be include, however, for water in oil emulsions generally 1 to 8 units are preferred. A typical example of an ethoxylated alkylphenol emulsifier is octylphenoxy polyethoxyethanol (Triton X-15 Union Carbide).

ETHOXYLATED FATTY ALCOHOLS

The ethoxylated fatty alcohol emulsifiers are formed by the reaction of alcohols with chain lengths of C8 to C18 with ethylene oxide. The number of ethylene oxide units used are generally from 2 to 20. 2 to 8 units are preferred for water in oil emulsions. Either primary or secondary alcohols can be used to form these emulsifiers. A typical example of an ethoxylated fatty alcohol emulsifier is POE (2) cetylalcohol (Brij 52 - ICI Specialities Chem).

PREPARATION OF N-DODECYL-(2-HYDROXYETHYL) SULFIDE

Example I

A solution of 422.6 g of 2-mercaptoethanol and 6.4 g of azolisisolbutyronitrile (AIBN) were prepared at ambient temperature (Solution I) 1000 g/1-dodecene were charged to a reaction vessel and heated to 80° C. under $N_2$ vapor space purge and 1 g of AIBN was added. Solution I was added uniformly while maintaining the reaction temperature between 80°–88° C. After Solution I was added, 7.2 g of AIBN were added and the reaction was maintained at 80°–88° C. until the total acid number was less than 20. The reaction product was vacuum stripped at 20 mm Hg and 149° C. until the 1-dodecene concentration was less than 4%. The reaction was cooled to 49° F. and filtered.

PREPARATION OF 2,2'-DI-(N-DODECYL-THIO)-DIETHYL ETHER

Example II

A solution of 6500.5 g of n-dodecyl-(2-hydroxyethyl) sulfide and 775 g of mixed xylenes were placed in a flask with a subsurface nitrogen purge. The mixture was heated to a temperature of 90° C. To the mixture was added 10 g of methanesulfonic acid. The mixture was heated to 150°–160° C. and a water/xylene azeotrope was distilled. The product was an industrial grade of 2,2'- di-(n-dodecylthio)-diethyl ether

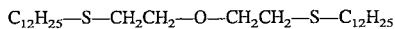

COMPOSITIONS

The compositions generally contain an emulsifying amount of an emulsifier (A) a major amount of a mixture of brine and liquid oil, (B) a friction modifier of the following formula:

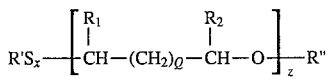

where X=1 to 4,
z=1 to 6,
Q=0 to 2
$R_1$ and $R_2$ are independently H or an aliphatic group containing from 1 to about 16 carbon atoms, provided that the sum of $R_1$ and $R_2$ is between 0 and about 16,
R' is an aliphatic group containing an average of from about 8 to about 24 carbon atoms, and
R" is selected from the group consisting of H, an aliphatic group containing between 1 and an average of about 18 carbons, and

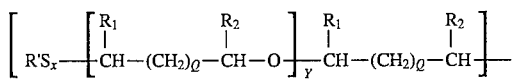

where Q, X, z, $R_1$, $R_2$, R' and R" are defined as set forth above, and Y is 0 to 5. In a preferred embodiment, z is 1. In the most preferred embodiment, Q=0, $R_1$ and $R_2$ are both H, X, and z all equal 1, R' is n-dodecyl, and R" is H.

The compositions may optionally include a surfactant, weighting agents, organophilic clays and lime.

The composition may contain from about ½ pound to about 15 pounds of friction modifier per barrel of composition. Levels of about 1 to about 12 pounds or about 2 to about 10 pounds of friction modifier per barrel of composition are preferred. A level of about 4 to about 8 pounds of friction modifier per barrel of composition is most preferred. The corn position may optionally include weighting agents, surfactants organophilic clays, lime, and other ingredients commonly used in well drilling muds.

BRINE-LIQUID OIL MIXTURES

The brine is present in a mixture with a liquid oil. In one embodiment, the brine is present in the mixture in an amount from about 5, or about 10, or about 15, or about 25 up to about 90, or to about 75, or to about 55 parts by volume. In this embodiment, the liquid oil is present in the mixture in an amount from about 10, or about 25, or about 45 up to about 95, or to about 90, or to about 85, or to about 75 parts by volume. The total parts by volume of brine plus the total parts by volume of liquid oil is 100 parts by volume of the mixture. In one embodiment, the brine is a discontinuous phase and the liquid oil is a continuous phase. In another embodiment, the mixture contains a major amount of a liquid oil, preferably from about 65, or about 70, or about 75 up to about 90, or to about 85 parts by volume. In this embodiment, the brine is present in an amount from about 10, or about 15 up to about 35, or about 20, or about 25 parts by volume of the mixture.

The brine useful in the compositions and methods of the present invention may be naturally occurring field brine or one formulated by various salts. The salts include calcium chloride, magnesium chloride, sodium chloride, potassium chloride, zinc chloride, and zinc bromide. The calcium chloride is generally present in an amount from 1% to about 40% by weight of the brine. The magnesium chloride is generally present in an amount from about 0.5% to about 24% by weight of the brine. The sodium chloride is generally present in an amount from about 1% to about 27% by weight of the brine. The potassium chloride is present in an amount from about 0.5% to about 24% by weight of the brine. The zinc chloride or zinc bromide is generally present in an amount from about 0.5% to about 80% by weight of the brine.

The mixture also includes a liquid oil. Examples of these oils include petroleum oils, such as oils of lubricating viscosity, crude oils, diesel oils, mineral seal oils, kerosenes, fuel oils, white oils, and aromatic oils. Liquid oils include natural lubricating oils, such as animal oils, vegetable oils, mineral lubricating oils, solvent or acid treated mineral oils, oils derived from coal or shale, and synthetic oils. Vegetable oils include babassu oil, castor oil, coconut oil, corn oil, cottonseed oil, hemp oil, linseed oil, oiticica oil, olive oil, palm oil, peanut oil, rape oil, safflower, sesame oil, soybean, sunflower, and tung oil. Synthetic oils include hydrocarbon oils and halo-substituted hydrocarbon oils such as polymerized and interpolymerized olefins, for example polybutylenes, polypropylenes, propylene-isobutylene copolymers, chlorinated polybutylenes, poly(1-hexenes), poly(1-octenes), poly(1-decenes); alkyl benzenes; such as dodecylbenzenes, tetradecylbenzenes, dinonylbenzenes, di-(2-ethylhexyl)benzenes; polyphenyls such as biphenyls, terphenyls, and alkylated polyphenyls; and alkylated diphenyl ethers and alkylated diphenyl sulfides and derivatives, analogs and homologs thereof.

Alkylene oxide polymers and interpolymers and derivatives thereof where terminal hydroxy groups have been modified by esterification, etherification etc. constitute another class of synthetic oils. These are exemplified by polyoxyalkylene polymers prepared by the polymerization of ethylene oxide or propyleneoxide, the alkyl and aryl ethers of these polyoxyalkylene polymers such as methylpolyisopropylene glycol ethers, diphenyl and diethyl ethers of polyethylene glycol; and mono and polycarboxylic esters thereof, for example, the acetic esters, mixed C3–C8 fatty acid esters and C13 Oxo diester of tetraethylene glycol. Simple aliphatic ethers may be used as synthetic oils, such as, dioctyl ether, didecyl ether, di(2-ethylhexyl) ether.

Another suitable class of synthetic oils comprises the esters of fatty acids such as ethyl oleate, lauryl hexanoate, and decyl palmitate. The esters of dicarboxylic acids such as phthalic acid, succinic acid, maleic acid, azealic acid, sebacic acid, fumaric acid, adipic acid, linoleic acid dimer, malonic acid, alkyl malonic acids, alkenyl malonic acids with a variety of alcohols such as butyl alcohol, hexyl alcohol, dodecyl alcohol, 2-ethylhexyl alcohol, ethylene glycol, diethylene glycol monoethyl ether, propylene glycol. Specific examples of these esters include dibutyl adipate, di(2-ethylhexyl) sebacate, di-n-hexyl fumarate, dioctyl sebacate, diisoctyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethyl-hexanoic acid.

In one embodiment, the liquid oil is a mineral or vegetable oil having a kinematic viscosity from about 3, or about 3.5, or about 4 up to about 15, or to about 11, or to about 10, or to about 9 centistokes at 100° C. Useful mineral oils include 40, 100, 150, 200 and 300 neutral mineral oils. Examples of specific liquid hydrocarbons include No. 2 diesel oil, Exxon ESCAID® 11 O (a petroleum distillate comprising 20% aromatics, 56.6% paraffins and 23.4 naphthenes available commercially from ESSO), Total HDF 200, Conoco LVT oil (a mineral oil with the viscosity of 1.8 centistokes at 40° C. available from Conoco Oil Company), and Conoco LVT 200 (a mineral oil with a viscosity of 2.1 centistokes at 40° C. and less than 0.5% aromatic content, available from Conoco Oil Company).

Surfactant

The surfactant is generally present in the compositions in an amount from about 1, or about 2 up to about 20, or to about 15, or to about 10 pounds per barrel of the composition. The function of the surfactant is to promote oil wetting of the solid particles in the drilling fluid, especially the weighting agents such as barite.

The surfactants include polyoxyalkylene amines, polyoxyalkylene amides, polyoxyalkylene alcohols, polyoxyalkylene phenols, polyoxyalkylene esters, fatty acid salts, amine or alkaline earth or transition metal sulfonates, or reaction products of a hydroxyamine or a polyalkylene polyamine and a carboxylic acylating agent selected from the group consisting of monocarboxylic acylating agents, dicarboxylic acylating agents other than succinic acylating agents and tricarboxylic acylating agents.

The production of sulfonic acids from detergent manufacture by-products by reaction with, e.g., $SO_3$, is well known to those skilled in the art. See, for example, the article "Sulfonates" in Kirk-Othmer "Encyclopedia of Chemical Technology", Second Edition, Vol. 19, pp. 291 et seq. published by John Wiley & Sons, N.Y. (1969).

The salt of the sulfonic acid may be derived from an amine or an alkaline earth or transition metal compound. Any of the above described amines may be used. The alkaline earth and transition metal salt include magnesium, calcium, barium, titanium, iron, and zinc salts. In one embodiment, the metal salt is an alkaline earth metal salt, preferably a calcium or barium sulfonate, preferably a calcium sulfonate.

The metal salts are prepared by procedures known to those in the art. One method of their preparation is to mix a sulfonic acid with an alkaline earth of transition metal containing base, such as an oxide or hydroxide.

Weighting Agents

The compositions of the present invention may additionally contain weighting agents. These agents increase density of drilling muds and include galena (PbS), hematite ($Fe_2O_3$), magnetite ($Fe_3O_4$), ilmenite ($FeTiO_3$), barite ($BaSO_4$), siderite ($FeCO_3$), celestite ($SrSO_4$), dolomite ($CaMg(CO_3)2$), and calcite ($CaCO_3$). Particularly useful weighting agents include barium sulfate and iron oxide. Weighting agents may also be soluble salts such as sodium chloride, sodium bromide, sodium carbonate, potassium chloride, potassium carbonate, calcium bromide, zinc chloride, and zinc bromide. The weighting agents may be present in an amount from about 20, or about 100, or about 250, to about 900, or to about 700, or to about 600 pounds per barrel. In one embodiment, the weighting agent is present in an amount from about 300 to about 500 or about 400 pounds per barrel (ppb).

Organophilic Clay

The compositions may also contain commercial clays such as bentonite, attapulgite, sepiolite, etc. In one embodiment, the compositions may also include an organophilic clay. Organophilic clays are clays, such as montmorillonite, hectorite, saponite, attapulgite and illite, that have absorbed amine salts. These clays are converted from water-yielding (e.g., present in the brine phase of the emulsion) to oil-yielding (e.g., present in the liquid oil phase) clays by the absorption of amine salts. Organophilic clays are preferably oil-wettable and are dispersed in the oil phase to produce viscosity and gel properties. Montmorillonite, bentonite and attapulgite are preferred, with montmorillonite more preferred. Water and methanol may be used to activate the organophilic clay. The organophilic clay is present in an amount from about 1, or about 2 up to about 10, or to about 8 pounds per barrel (ppb).

Lime

The compositions of the present invention may also include lime. The lime in combination with the reaction products or their salts (A) provides improved thickening to the compositions. The lime is generally present in an amount from about 1, or about 2, up to about 10, or about 8 pounds per barrel (ppb).

Well-Drilling Compositions

In one embodiment, the compositions of the present invention are well-drilling compositions. In one embodiment, the well-drilling compositions are invert water-in-oil emulsions. The well-drilling compositions generally have a density of about 9, or about 10 to about 21, or to about 18, or to about 14 pounds per gallon.

The following examples illustrate the compositions of the present invention.

EXAMPLE A–C

Composition A is prepared by combining 165 g of Conoco LVT 200 Oil, 6 g of polyamide emulsifier, 6 g of polyamide synthetic liquid blend and 5 g of lime into an appropriate size container. This mixture is then mixed for a total of 10 minutes with moderate shear on a Hamilton Beach type mixer.

At the end of the 10 minutes mixing interval add 5 g of organophillic clay and mix for an additional 10 minutes at high shear on a Hamilton Beach type mixer.

In a suitable container add 15 g of anhydrous calcium chloride to 49 g of tap water with mixing.

To the above mixture consisting of: Conoco LVT 200 oil, polyamide emulsifier, polyamide synthetic liquid blend, lime, and organophillic clay, slowly add the warmed calcium chloride solution over 10 minutes with stirring. Shear the entire mixture for an additional 10 minutes at high shear on a Hamilton Beach type mixer. in this case, high shear is achieved when a deep vortex is observed.

To the previous mixture add 339 g of barite over 10 minutes with mixing at high shear on a Hamilton beach type mixer. Continue mixing at high shear for a minimum of 10 minutes or until uniform. The composition of example A does not contain the friction modifier and this example serves as a comparative example but is not an example of the invention.

In example B, the same procedure is followed as with A, with the inclusion of 5 g of the friction modifier of Example I added at the end of the 10 minute mixing interval. Mix thoroughly with a Hamilton Beach type mixer until uniform.

In example C, the same procedure is followed as with A, with the inclusion of 8 g of the friction modifiers of Example I added at the end of the 10 minute mixing interval. Mix thoroughly with a Hamilton Beach type mixer until uniform.

TABLE

|  | Example A | Example B | Example C |
|---|---|---|---|
|  | (all values in ppb) | | |
| Conoco LVT 200 | 165 | 165 | 165 |
| Polyamide Emulsifier | 6 | 6 | 6 |
| Polyamide/Synthetic Liquid Blend | 6 | 6 | 6 |
| Lime (Mississippi) | 5 | 5 | 5 |
| Organophilic Clay | 5 | 5 | 5 |
| Water | 49 | 49 | 49 |
| Calcium Chloride (Anhydrous) | 15 | 15 | 15 |
| Barite | 339 | 339 | 339 |
| Friction Modifier of Example I | 0 | 5 | 8 |
| Plastic Viscosity | 31 | 30 | 29 |
| Yield Point | 7 | 9 | 8 |
| 10 sec. gel | 7.5 | 7.5 | 7 |
| 10 min. gel | 8 | 8 | 7.5 |
| Coefficient of Friction | 0.0951 | 0.0496 | .0455 |
| % Reduction in the Coefficient of Friction |  | 47.84 | 52.16 |

EXAMPLE D–E

Composition D is prepared by combining 165 g of Chevron Isotec alpha olefin oil, 6 g of polyamide emulsifier, 6 g of polyamide synthetic liquid blend and 5 g of lime into an appropriate size container. This mixture is then mixed for a total of 10 minutes with moderate shear on a Hamilton Beach type mixer.

At the end of the 10 minutes mixing interval add 5 g of organophillic clay and mix for an additional 10 minutes at high shear on a Hamilton Beach type mixer.

In a suitable container add 15 g of anhydrous calcium chloride to 49 g of tap water with mixing.

To the above mixture consisting of: Chevron Isotec alpha olefin oil, polyamide emulsifier, polyamide synthetic liquid blend, lime, and organophillic clay, slowly add the warmed calcium chloride solution over 10 minutes with stirring. Shear the entire mixture for an additional 10 minutes at high shear on a Hamilton Beach type mixer. in this case, high shear is achieved when a deep vortex is observed.

To the previous mixture add 339 g of Barite over 10 minutes with mixing at high shear on a Hamilton Beach type mixer. Continue mixing at high shear for a minimum of 10 minutes or until uniform. The composition of example D does not contain the friction modifier and this example serves as a comparative example but is not an example of the invention.

In example E, the same procedure is followed as with D, with the inclusion of 5 g of the friction modifier of Example II added at the end of the 10 minute mixing interval. Mix thoroughly with a Hamilton Beach type mixer until uniform.

TABLE

|  | Example D | Example E |
|---|---|---|
|  | (all values in ppb) | |
| Chevron alpha olefin oil | 165 | 165 |
| Polyamide Emulsifier | 6 | 6 |
| Polyamide/Synthetic Liquid Blend | 6 | 6 |
| Lime (Mississippi) | 5 | 5 |
| Organophilic Clay | 5 | 5 |
| Water | 49 | 49 |
| Calcium Chloride (Anhydrous) | 15 | 15 |
| Barite | 339 | 339 |
| Friction Modifier of Example II | 0 | 5 |
| Plastic Viscosity | 26 | 29 |
| Yield Point | 6 | 3 |
| 10 sec. gel | 8 | 8 |
| 10 min. gel | 9 | 8 |
| Coefficient of Friction | 0.1094 | 0.0482 |
| % Reduction in the Coefficient of Friction |  | 55.94 |

TESTING THE COEFFICIENT OF FRICTION

The coefficient of friction of the prepared drilling mud was determined using an OFITE Lubricity Tester. This is a standard instrument designed for determining the coefficient of friction of drilling fluids and lubricant additives. In the standard test of drilling fluids, a hardened steel block and a ring are placed in contact with each other in the presence of the fluid to be tested. A load of 150 inch pounds is placed upon a level arm which applies a pressure of between 5,000 and 10,000 pounds per square inch on the fluid to be tested which is between the block and the ring. The ring is rotated at 60 RPM. For testing of the oil-bag drilling fluids, the test was modified to increase the load to 250 inch pounds mad the speed of rotation to 160 RPMs. All the tested drilling fluids were run under these modified conditions, and, accordingly, the coefficient of friction of values are directly comparable to each other.

While the invention has been explained in relation to its preferred embodiments, it is to be understood that various modifications thereof will become apparent to those skilled in the an upon reading the specification. Therefore, it is to be understood that the invention disclosed herein is intended to cover such modifications as fall within the scope of the appended claims.

I claim:

1. A drilling fluid composition comprising a water-in-oil emulsion formed from a brine, a liquid oil, (A) an emulsifier, (B) a friction modifier of the following formula:

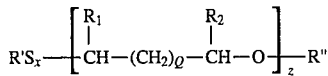

where X=1 to 4, z=1 to 6,

Q=0 to 2

$R_1$ and $R_2$ are independently H or an aliphatic group containing from 1 to about 16 carbon atoms, provided that the sum of the carbon atoms in $R_1$ and $R_2$ is between 0 and about 16, R' is an aliphatic group containing an average of from about 8 to about 24 carbon atoms, and R" is selected from the group consisting of H, an aliphatic group containing between 1 and an average of about 18 carbons, and

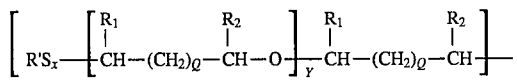

where Q, X, z, $R_1$, $R_2$, R' and R" are defined as set forth above, and Y is 0 to 5.

2. The composition of claim 1 wherein R" is hydrogen.

3. The composition of claim 1 wherein X=1.

4. The composition of claim 1 wherein $R_1$ is hydrogen and $R_2$ contains 1 to 10 carbon atoms.

5. The composition of claim 1 wherein $R_2$ is hydrogen and $R_1$ contains 1 to 10 carbon atoms.

6. The composition of claim 1 wherein $R_1$ is hydrogen and $R_2$ contains 1 to 2 carbon atoms.

7. The composition of claim 1 wherein $R_2$ is hydrogen and $R_1$ contains 1 to 2 carbon atoms.

8. The composition of claim 1 wherein z is 1 to 4.

9. The composition of claim 1 wherein z is 1.

10. The composition of claim 2 wherein Q=0, $R_1$ and $R_2$ are both hydrogen, X and z are both 1, and R' is n-dodecyl.

11. The composition of claim 1 wherein R" is an aliphatic group containing an average of from 1 to an average of 14 carbon atoms.

12. The composition of claim 1 wherein R" is an aliphatic group containing an average of from 1 to an average of 12 carbon atoms.

13. The composition of claim 1 wherein R" is an aliphatic group containing an average of from 1 to an average of 8 carbon atoms.

14. The composition of claim 1 wherein R" is an aliphatic group containing an average of from 1 to an average of 4 carbon atoms.

15. The composition of claim 1 wherein R" is represented by the structure:

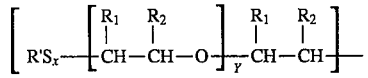

where X=1 to 4, $R_1$ and $R_2$ are independently H or an aliphatic group containing from 1 to about 16 carbon atoms, provided that the sum of the carbon atoms in $R_1$ and $R_2$ is between 0 and about 16, R' is an aliphatic group containing an average of from about 8 to about 24 carbon atoms, and Y is 0 to 5.

16. The composition of claim 15 wherein Y=1 to 4.

17. The composition of claim 15 wherein Y=0 to 2.

18. The composition of claim 15 wherein Q=0, Y=0, $R_1$ and $R_2$ are both hydrogen, X and z are both 1, and R' is n-dodecyl.

19. The composition of claim 1 wherein the friction modifier is present at a level of between about ½ and about 15 pounds of friction modifier per barrel of composition.

20. The composition of claim 1 wherein the friction modifier is present at a level of between about 1 to and about 12 pounds of friction modifier per barrel of composition.

21. The composition of claim 1 wherein the friction modifier is present at a level of between about 2 and about 10 pounds of friction modifier per barrel of composition.

22. The composition of claim 1 wherein the friction modifier is present at a level of between about 4 and about 8 pounds of friction modifier per barrel of composition.

23. The composition of claim 1, further comprising at least one surfactant.

24. The composition of claim 1, further comprising at least one weighting agent.

25. The composition of claim 1, further comprising at least one at least one organophilic clay.

26. The composition of claim 1, further comprising lime.

27. The composition of claim 1 wherein the weighting agent is barium sulfate, iron oxide, calcium chloride, calcium bromide, zinc bromide, or zinc chloride.

28. The composition of claim 1 wherein the brine is present in the mixture in an amount from about 5 to about 90 parts by volume, and the liquid oil is present in the mixture in an amount from 10 to about 95 parts by volume, wherein the total parts by volume of brine and hydrocarbon total 100 parts by volume.

29. The composition of claim 1 wherein the brine is a discontinuous phase and the liquid oil is a continuous phase.

30. A method, comprising the steps of introducing the composition of claim 1 into a wellbore and drilling, completing or working over the wellbore hole.

* * * * *